DISTORTION-FREE AUTOMATIC VOLUME CONTROL AMPLIFIER
Original Filed Dec. 29, 1944
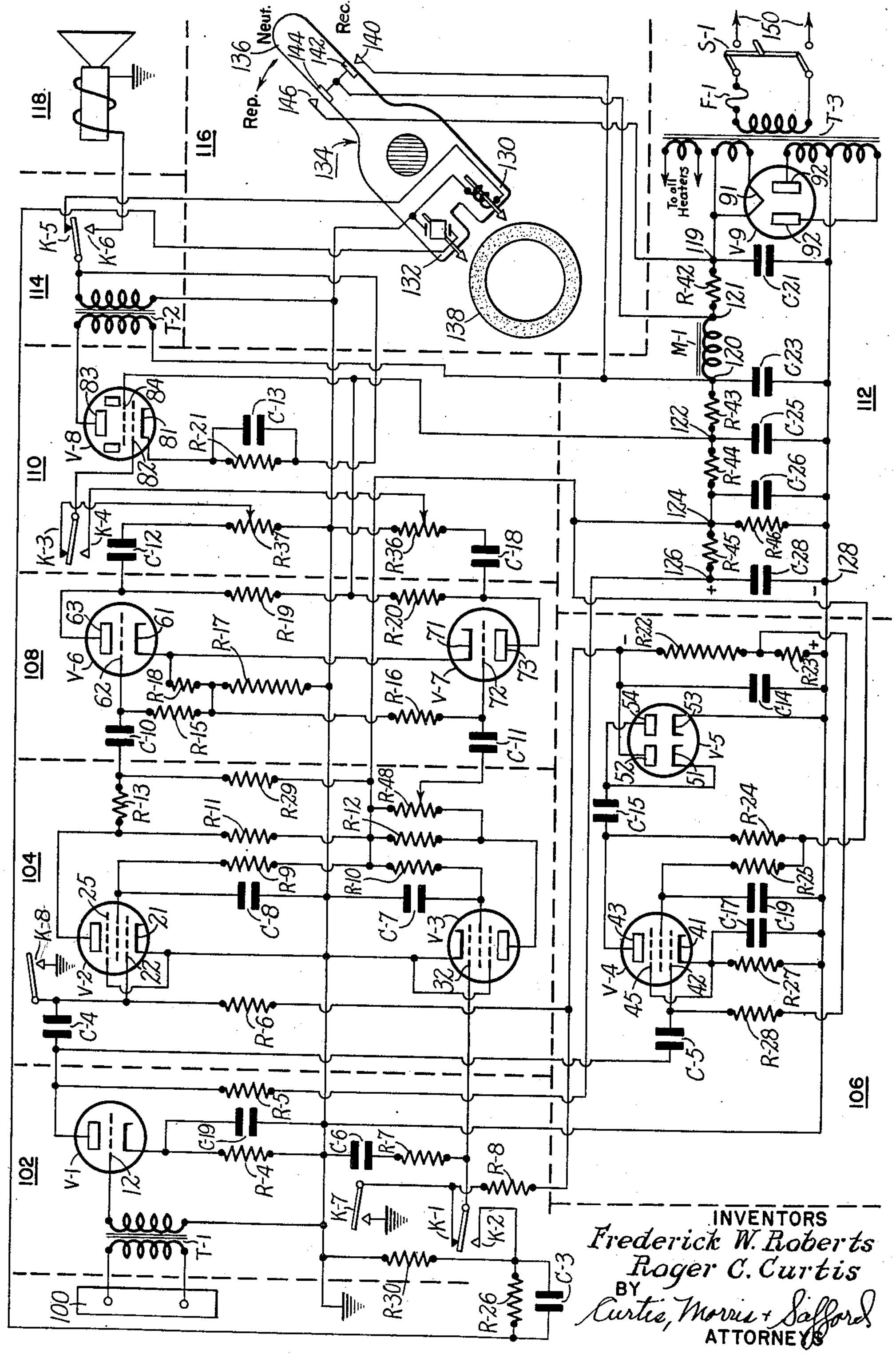
INVENTORS
Frederick W. Roberts
Roger C. Curtis
BY Curtis, Morris + Safford
ATTORNEYS Patented Apr. 10, 1951

2,548,822

UNITED STATES PATENT OFFICE 2,548,822

DISTORTION-FREE AUTOMATIC VOLUME CONTROL AMPLIFIER

Frederick W. Roberts, Fairfield, and Roger C. Curtis, New Haven, Conn., assignors to Dictaphone Corporation, Bridgeport, Conn., a corporation of New York Original application December 29, 1944, Serial No. 570,280. Divided and this application March 24, 1947, Serial No. 736,752

6 Claims. (Cl. 179—171)

This invention relates to control circuits for sound recording and reproducing systems, and more especially to automatic volume control or compression circuits in electronic tube amplifiers for use with such systems.

The present application is a division of patent application Serial No. 570,280, filed December 29, 1944.

In order to produce satisfactory records on the usual recording mediums with normal types of recorder elements, the level of the signal applied to the recorder element must be maintained within a relatively narrow range regardless of the original range of the sound being recorded. This is especially difficult when a single recording system must be used to record sounds of widely different levels from many sources, such as in the recording of telephone conversations, radio programs or communications, conferences, speeches, and the like. This reduction in the volume range of the sounds being recorded to the limited range required at the recorder is usually accomplished by the provision in an electronic tube amplifier of an automatic volume compression circuit, frequently referred to as an "A. V. C." circuit. In the usual operation of such circuits a D. C. voltage is produced which is proportional to the input signal applied to the amplifier if the A. V. C. circuit is of the "forward-acting" type, or to the output signal of the amplifier if the A. V. C. circuit is of the "backward-acting" type. This D. C. voltage is applied to the grid of one or more variable-gain amplifier tubes, which may be of the "super-control" or variable-mu type, to control their amplification factor and therefore the gain of the amplifier in accordance with the strength of the signal.

Ideally such an A. V. C. circuit should operate almost instantaneously to bring the amplifier gain to the proper value before the first portion of any sound or syllable of speech can "blast" the recorder unit and "overcut" the recording medium. Experience has shown that in order to obtain a high quality recording the operating time of the A. V. C. circuit, i. e. its "compression time," should be about ten milliseconds or less. Such a compression time has been almost impossible to realize practically in "single-ended" amplifiers, i. e. other than "push-pull" amplifiers, for two principal reasons. The first reason is that a fast acting A. V. C. circuit having a short compression time causes the magnitude of the average level of the signal passing through the amplifier to vary at such a high rate as to produce audible tone or "bump," as it is frequently called. For example, with a ten milli-second compression time, the amplifier gain varies at a rate comparable to that of a sound having a frequency of one hundred cycles per second. This sound or "bump" occurs each time the A. V. C. circuit operates and is superimposed upon and interferes with the signal being amplified. In the past, in order to avoid this undesirable effect, it was necessary to increase the compression time of the A. V. C. circuit until its rate of operation was reduced to some value comparable to a subaudible frequency. However, such a remedy is limited by the amount of blasting and overcutting, caused by the reduction in the speed of operation of the A. V. C. circuit, which can be tolerated in the recording system. The second reason is that it is impossible to filter the A. V. C. control voltage satisfactorily in an A. V. C. circuit having a short compression time because such a short action period requires circuits with small time-constants which means circuits having small resistance and capacity values and therefore limited filtering effectiveness. In order to operate satisfactorily the A. V. C. control voltage should be substantially pure D. C. With insufficient filtering in the A. V. C. circuit such as results from short time-constant circuits, the A. V. C. potential will be a pulsating D. C. containing an A. C. component corresponding to the signal being amplified, and this component will be impressed on the grids of the amplifier tubes along with the signal, thus causing considerable distortion in the amplified signal. Normally, this effect can be overcome only by increasing the compression time of the A. V. C. circuit because an A. V. C. circuit which operates at a rate comparable to some audible frequency must of necessity transmit that frequency and therefore cannot be designed to eliminate this distortion voltage by filtering. Thus, single-ended amplifiers having a sufficiently rapid A. V. C. action for high quality recording are subject to the disadvantages of "bumping" and distortion. Further, rapid acting A. V. C. circuits may cause blocking of the amplifier tubes due to large swings in the A. V. C. potential. Although these disadvantages may be partially overcome by the use of a push-pull transformer-coupled amplifier in which the A. V. C. potential is applied "in phase" to the grids of the first two tubes, even such an amplifier is subject to blocking and distortion when used in conjunction with an A. V. C. circuit having a short compression time.

In accordance with the present invention a high fidelity single-ended amplifier may be operated throughout a wide range of signal levels with an A. V. C. circuit having a very short compression time without "bumping," distorting, or blocking, by the provision of simple and novel circuit arrangements for cancelling out the "bumps" and distortion, and preventing blocking of the amplifier, all without the use of high quality transformers and other expensive and complex circuit elements.

Accordingly, therefore, it is an object of this invention to provide an electronic tube amplifier having a rapid action A. V. C. circuit which does not cause "bumping," distortion, or blocking. It is a further object to provide such an amplifier which is particularly adapted for use in sound recording and reproducing apparatus for recording sounds from sources of widely divergent levels, and to provide novel circuits for controlling its operation.

These and other apparent objects and advantages of this invention are obtained by the means described in the following specification and may be more readily understood by reference to the accompanying drawing which shows schematically an electric recording and reproducing apparatus embodying the invention.

Referring to the drawing, the recording and reproducing apparatus shown therein generally comprises a source of signal to be recorded, generally indicated by the blocked area 100, such as a microphone, telephone, radio, or the like; a pre-amplifier stage, generally indicated at 102, including a voltage amplifier tube V—1; an amplifier A. V. C. stage, generally indicated at 104, including A. V. C. controlled amplifier tubes V—2 and V—3; an A. V. C. potential amplifying and rectifying circuit, generally indicated at 106, including an amplifier tube V—4 and a rectifier tube V—5; a phase-inverter cathode-follower circuit, generally indicated at 108, including vacuum tubes V—6 and V—7; a power amplifying stage, generally indicated at 110, including a power amplifier tube V—8; a power supply for all of these circuits generally indicated at 112, including a rectifier tube V—9; a recorder and reproducer mechanism, generally indicated at 116; and an output circuit, generally indicated at 114, which may be selectively connected either to an electrical recorder element 130 or a loudspeaker unit 118 dependent upon whether the apparatus is conditioned for recording or reproducing.

The signal to be record from the signal source 100 is impressed through an input transformer T—1 to the grid 12 of the pre-amplifier triode V—1 of the pre-amplifier stage 102. The pre-amplifier tube V—1 is provided with the customary cathode bias resistor R—4 with its bypass condenser C—19, and a plate load resistor R—5 connected to a suitable positive high voltage terminal 126 in the power supply 112. The amplified signal appearing across the plate resistor R—5 of tube V—1 is applied through a coupling condenser C—4 to the control grid 22 of the remote-cut-off screen-grid pentode V—2 in the amplifier A. V. C. stage 104 where it is amplified in a normal manner so that the amplified signal appears across its plate load resistor R—11 which is connected to a positive high voltage terminal 124 in power supply 112. The suppressor grid 25 of the pentode V—2 is connected to the cathode 21 in the usual manner, and V—2 is provided with the customary screen-grid resistor R—9 and bypass condenser C—8. The control grid 22 of tube V—2 is arranged to be grounded through a relay contact K—8 to prevent the appearance of any parasitic signals on the grid 22 when the apparatus is conditioned for reproducing, as will be described hereinafter.

The amplified signal from pre-amplifier stage 102 is also fed to the A. V. C. circuit 106 through a condenser C—5 to the control grid 42 of a remote-cut-off screen-grid pentode V—4 which amplifies the A. V. C. potential before it is rectified by the A. V. C. rectifier V—5. This A. V. C. potential amplifying tube V—4 is provided with the usual grid return resistor R—28, cathode bias resistor R—27 with its bypass condenser C—17, screen-grid resistor R—25 with its bypass condenser C—19, and plate load resistor R—24 connected to a positive high voltage tap 124 in the power supply 112. Its suppressor grid 45 is connected to its cathode 41 in the usual manner. The amplified A. V. C. potential which appears across the plate resistor R—24 of amplifier tube V—4 is applied through a coupling condenser C—15 to the A. V. C. rectifier V—5. This rectifier V—5 is a double diode connected in a voltage-doubler arrangement as shown in the diagram so that the rectified A. V. C. pulsating D. C. potential appears across resistors R—22 and R—23, shunted by a condenser C—14. Briefly, this voltage-doubler rectifier arrangement operates as follows: during the portion of the cycle of the signal impressed on grid 42 of A. V. C. potential amplifying tube V—4 when the grid is going negative, the current through this tube decreases, thus decreasing the voltage drop across plate resistor R—24 and increasing the positive potential above ground of plate 43 and the side of coupling condenser C—15 connected thereto. This causes condenser C—15 to be charged to a voltage equal to the peak value of this voltage change through cathode 53 and anode 54 of one of the diodes of rectifier tube V—5. During the next half cycle of the signal voltage when the grid 42 of tube V—4 is going positive, the current through tube V—4 increases, thus increasing the voltage drop across plate resistor R—24 and thereby decreasing the potential above ground of the plate of condenser C—15 connected to this resistor and the plate 43 of tube V—4. This, in turn, causes condenser C—15 to discharge through cathode 51 and anode 52 of the other diode of rectifier tube V—5 and condenser C—14 thereby causing condenser C—14 to be charged to a voltage substantially equal to the voltage change across plate resistor R—24 of tube V—4 during one complete cycle of the signal voltage. This discharge of condenser C—15 prepares it for the next negative half cycle of the signal voltage and at the same time produces across resistors R—22 and R—23 the D. C. potential to be used as the A. V. C. control potential and which is proportional to the magnitude of the signal potential. Part of this potential is applied as a negative bias to the control grid 42 of the A. V. C. potential amplifying pentode V—4 by connecting the juncture between resistors R—22 and R—23 through the grid return resistor R—28 to the control grid 42 of tube V—4. With this novel arrangement of applying a portion of the A. V. C. D. C. potential back to the grid of the A. V. C. potential amplifying tube V—4, an A. V. C. effect is superimposed upon the original A. V. C. effect so as to greatly increase the signal range over which the A. V. C. circuit is effective. By choice of suitable values for resistors R—22 and R—23 determining the proportion of the A. V. C. D. C. potential fed back to tube V—4, the slope of the A. V. C. operating characteristic curve can be predetermined as desired.

The A. V. C. D. C. potential developed across resistors R—22 and R—23 is applied through a connection from the negative end of resistor R—22 through a grid resistance R—6 to the control grid 22 of the amplifier A. V. C. tube V—2 above-described and, in the same phase, through a similar resistance R—8 and a relay contact K—1 hereinafter to be described, to the control grid 32 of the other remote-cut-off pentode tube V—3 of the amplifier A. V. C. stage 104. Tube V—3 is identical to tube V—2 and is similarly provided with the usual plate load resistor R—12 connected to high voltage terminal 124, and screen grid resistor R—10 and bypass condenser C—7. A series circuit comprising a resistor R—7 and a condenser C—6 is connected from the control grid 32 of tube V—3 to ground so that the impedance across the input of tube V—3 is substantially equal to the impedance across the input of tube V—2 due to the plate circuit impedance of V—1 and the grid circuit impedance of V—4, so that the response of tubes V—2 and V—3 to changes in the A. V. C. potential applied thereto through resistors R—6 and R—8, respectively, is substantially identical. The control grid 32 of tube V—3 may also be connected through a relay contact K—2, alternate to the above-mentioned contact K—1, to a grid return resistor R—30 and, through a filter formed of a resistor R—26 and a shunting condenser C—3, to the reproducing element 132 of the recorder-reproducer mechanism 116 when the apparatus is conditioned for reproducing and tube V—3 is operated as the input amplifier tube. At the same time the A. V. C. potential is ground by another relay contact K—7 connected to resistor R—8. The A. V. C. amplifier tube V—4, the components of its associated circuits, and the A. V. C. rectifier tube V—5 are all suitably selected so that condenser C—14 can be charged rapidly to the full A. V. C. potential, i. e. in a period of the order of ten milli-seconds. Inasmuch as the charging time of condenser C—14 determines the compression period of the A. V. C. circuit this permits the A. V. C. response of the amplifier to be made sufficiently rapid to permit high quality recording without blasting or overcutting.

With the circuit thus far described, it is evident that the voltage which appears across the plate resistor R—11 of tube V—2 is a combination of the signal from the source 100 amplified by tubes V—1 and V—2, plus any "bump" produced by operation of the A. V. C. circuit, plus any distorting voltage which may come from the A. V. C. circuit due to the presence in the A. V. C. potential of an A. C. component resulting from some of the signal voltage leaking through the A. V. C. circuit caused by lack of sufficient filtering in the A. V. C. circuit. On the other hand, the voltage which appears across the plate resistor R—12 of tube V—3 is merely a combination of any "bump" voltage produced by operation of the A. V. C. circuit plus any distortion voltage appearing in the A. V. C. potential due to the presence of an unfiltered A. C. component of the signal. These "bump" and distortion voltages appearing across resistor R—12 are in phase with, and of substantially equal magnitude to, the two similar voltage components appearing across plate resistor R—11 of tube V—2.

These voltages appearing across resistors R—11 and R—12 are impressed, respectively, upon the control grids 62 and 72 of the two triodes V—6 and V—7 connected in the phase-inversion cathode-follower circuit 108 in such a manner, hereinafter to be described, that the A. V. C. "bump" and distortion voltages appearing across resistor R—11 are cancelled by the corresponding voltages appearing across resistor R—12, thereby leaving only the signal voltage to pass on to the power amplifier stage 110. This is accomplished by the novel circuit connections shown in the drawing. The amplified voltage appearing across resistor R—11 comprising components resulting from the signal voltage, the A. V. C. "bump" voltage, and the A. V. C. distortion voltage, is reduced by a voltage divider formed of a resistor R—13 and a resistor R—29, and this reduced voltage is applied through a coupling condenser C—10 to the control grid 62 of one of the triodes V—6 of the cathode-follower phase-inverter circuit 108. The amplified voltage appearing across the plate resistor R—12 of tube V—3 comprising components resulting from the A. V. C. "bump" and distortion voltages is fed through an attenuator R—48, connected in parallel with resistor R—12, and a coupling condenser C—11 to the control grid 72 of the other triode V—7 in the cathode-follower phase-inverter circuit 108. The cathodes 61 of tube V—6 and 71 of tube V—7 are connected together and to ground through a grid biasing resistor R—18 and a cathode-follower load resistor R—17. The grid returns of the tubes V—6 and V—7 are made through grid resistors R—15 and R—16, respectively, connected together and to the junction of resistors R—17 and R—18. Resistance R—18 is of such value as to provide a normal operating grid bias for the tubes V—6 and V—7, whereas cathode follower resistor R—17 is a much higher resistance than R—18 and forms part of the plate load of these tubes, as is usual in normal cathode-follower operation. The remainder of the plate load of these tubes is provided by two resistors R—19 and R—20 connected from the anodes 63 and 73 of tubes V—6 and V—7, respectively, to a suitable high voltage terminal 122 in the power supply 112. The operational characteristics of the cathode-follower phase-inverter circuit just described are such that any voltage impressed on the control grid of one of the tubes, e. g. tube V—6, not only appears across the plate resistor of that tube, e. g. plate resistor R—19, but also appears across the plate resistor of the other tube, e. g. plate resistor R—20 of tube V—7, in approximately equal magnitude but in opposite phase. Without going into a rigorous analysis of the operational characteristics of this circuit which bring about these results, the cause of these effects may be understood from the following brief explanation. When the control grid 62 of tube V—6 becomes more positive its increased cathode-anode current causes the voltage drop across cathode-follower resistor R—17 to increase, thus causing the cathode 61 likewise to become more positive with respect to ground, thus "following" the potential applied to the control grid 62 while the voltage drop across plate resistor R—19 increases simultaneously. At the same time, assuming that no signal is impressed on the control grid 72 of tube V—7 so that its grid remains at a fixed potential with respect to ground, the cathode 71 of tube V—7, being connected to the cathode 61 of tube V—6, becomes more positive with respect to its control grid 72, i. e. its control grid becomes more negative with respect to its cathode, thus reducing its cathode-anode current and hence reducing the voltage drop across its plate resistor R—20 at the same time that the voltage drop across the plate resistor R—19 of tube V—6 is increased. Thus any voltage impressed on the control grid of one of the two tubes V—6 and V—7 will appear across the plate resistor of that tube and also across the plate resistor of the other tube but in reverse phase.

The novel and advantageous results achieved by the circuit just described are now apparent. The voltage appearing across plate resistor R—11 of tube V—2, comprising the signal voltage plus the A. V. C. "bump" voltage plus the A. V. C. distortion voltage, is impressed on the control grid 62 of tube V—6 so that this voltage appears across the plate resistor R—19 of tube V—6 and at the same time it appears in inverse phase across the plate resistor R—20 of tube V—7. Simultaneously, the voltage appearing across plate resistor R—12 of tube V—3, comprising the A. V. C. "bump" voltage plus the A. V. C. distortion voltage, is impressed upon the control grid 72 of tube V—7 so that it appears across the plate resistor R—20 of tube V—7 in phase with the corresponding voltage appearing across R—19 as a result of the "bump" and distortion voltages impressed on grid 62. However, due to the novel operation of this circuit, it also appears in inverse phase across resistor R—19. Thus, the total voltage appearing across the plate resistor R—19 of tube V—6 is equal to the sum of the signal voltage plus the A. V. C. "bump" voltage plus the A. V. C. distortion voltage, due to the voltage applied to the grid 62 of tube V—6, plus the two last-named voltages in a negative sense, their phase being inverted, due to the voltage applied to grid 72 of tube V—7, so that the net voltage appearing across resistor R—19 is the signal voltage alone, the A. V. C. "bump" and distortion voltages being cancelled out.

An actual operation, it is an inherent characteristic of the cathode-follower phase-inverter circuit above-described that when a voltage is impressed on the grid of one tube the voltage appearing across the output resistor of that tube is slightly larger than the inverse phase voltage appearing across the output resistor of the other tube. One reason for this effect is that the effective cathode to grid voltage applied to the first tube is slightly greater than that applied to the second tube because of the feedback action of the common cathode-follower resistor R—17. Because of this circuit characteristic just described, in order to achieve complete cancellation of the A. V. C. "bump" and distortion voltages, the above-described voltage-divider circuits, formed of the two resistors R—13 and R—29, and of the attenuator R—48, are provided in parallel with the plate resistors R—11 and R—12, respectively, of tubes V—2 and V—3. This permits the ratio of the input voltages to tubes V—6 and V—7 to be set by a suitable adjustment of the attenuator R—48 so that the A. V. C. "bump" plus distortion voltage components impressed on the control grid 72 of tube V—7 from plate resistor R—12 of tube V—3 are slightly greater than the corresponding voltage components impressed on control grid 62 of the tube V—6 from the plate resistor R—11 of tube V—2, as above described.

The signal voltage, with the A. V. C. "bump" and distortion voltage components cancelled out, appearing across plate resistor R—19 of tube V—6 is impressed on the power amplifier stage 110 through a coupling condenser C—12, a recording volume control potentiometer R—37, and a relay contact K—3, hereinafter to be described, on the control grid 82 of a beam-power type power amplifier tube V—8.

When the apparatus is conditioned for reproducing, the signal is fed from reproducer element 132 through tube V—3 to the grid of tube V—7 where it appears across the plate resistors R—19 and R—20 of tubes V—6 and V—7. In order to permit the volume of reproduction to be set at a different value from the recording volume, a separate reproducing volume control is provided by utilizing the signal appearing across plate resistor R—20 instead of that appearing across R—19. This is accomplished by impressing this signal through a coupling condenser C—18, a reproducing volume control potentiometer R—36, and a relay contact K—4, alternate to contact K—3, on to the grid 82 of power amplifier tube V—8.

The circuit of the power amplifier stage 110 is of conventional design. The anode 83 of tube V—8 is connected to one side of the primary of an output transformer T—2, the other side of which is connected to a suitable high voltage tap 120 in the power supply 112. Its screen grid 84 is connected to another tap 122 therein of slightly lower voltage. The customary cathode biasing resistor R—21, with its bypass condenser C—13, is connected to the cathode 81, and, in order to provide a suitable inverse feed-back in this power amplifier circuit, the cathode lead from resistor R—21 is connected to one side of the secondary of output transformer T—2, the other side of the secondary being connected to the ground circuit. The high side of the secondary of the output transformer T—2 also is connected through a relay contact K—5 to the recorder element 130, the other side of which is connected to the grounded side of the secondary of transformer T—2. By means of a relay contact K—6, alternate to contact K—5, the output of the power amplifier stage 110 from the secondary of transformer T—2 can be connected to the loudspeaker 118.

The recorder element 130 and reproducer element 132, which may be of any suitable type such as those shown in U. S. Patents No. 2,181,437 to Norton or No. 2,318,828 to Yerkovich, of the recorder-reproducer mechanism 116 are mounted on a mechanical control mechanism, generally indicated at 134, operated by control lever 136, whereby either the recorder element or the reproducer element may be operatively positioned with respect to a suitable recording medium such as the wax cylinder 138. The control lever 136 is adjustable to three positions, a "recording" position in which the recorder 130 is moved into operative position with respect to the record 138, a "reproducing" position in which the reproducer element 132 is moved into operative position with respect to record 138, and a "neutral" position in which neither the recorder nor reproducer elements are in operative relationship to the record. Four contact points 140, 142, 144 and 146 are associated with the mechanical control mechanism 134 so that contact is made between points 140 and 142 when the control lever 136 is in "recording" position, and between contacts 144 and 146 when the control lever 136 is in "reproducing" position, and in which the circuits between contacts 140 and 142 and between 144 and 146 are open when the control lever 136 is in "neutral"

position. The function of these contacts will be hereinafter described.

The power supply 112 is of the conventional full-wave rectifier type comprising a power supply transformer T—3 connected to an alternating current supply line 150 through a fuse F—1 and a double-pole single-throw "off-on" switch S—1, a full-wave rectifier tube V—9 having a cathode 91 and two anodes 92 connected in the usual manner to the transformer T—3 and to a filter system comprising a plurality of filtering resistors R—42, R—43, R—44, R—45, a bleeder resistor R—46, and filter condensers C—21, C—23, C—25, C—26, and C—28 connected in the usual manner, providing D. C. operating potentials between a negative terminal 128 and a plurality of positive high voltage terminals 120, 122, 124 and 126 connected to the various circuits as above-described.

This power supply circuit is of the usual type except for the provision of a relay coil M—1 connected in series with the filter resistance R—42 in the positive side of the output of the power supply between a terminal 119 connected to the cathode 91 of rectifier V—9 and terminal 120, as shown in the drawings. This relay coil M—1 operates the various contact points K—1 through K—8, above-described, to close contact points K—1, K—3, and K—5 when it is deenergized, and to close contacts K—2, K—4, K—6, K—7 and K—8 when it is energized. The filter resistor R—42 has a resistance approximately equal to the resistance of relay coil M—1. With this arrangement, when the "off-on" switch S—1 is closed and the apparatus is in operative condition, the plate currents of all of the tubes pass through resistor R—42 and relay coil M—1. This relay coil M—1 and resistor R—42 are connected to the above-mentioned control contacts 140, 142, 144 and 146 associated with the recorder-reproducer mechanical control mechanism 134. Terminal 119 of resistor R—42 is connected to contact point 146, terminal 120 of relay coil M—1 is connected to contact 140, and a terminal 121 between relay coil M—1 and resistor R—42 is connected to contact points 142 and 144. Thus, when recording-reproducing lever 136 is in "recording" position, thus closing the circuit between contacts 140 and 142, relay coil M—1 is short circuited and therefore deenergized; whereas, when control lever 136 is in "reproducing" position, thus closing the circuit between contacts 144 and 146, resistor R—42 is short circuited, thus increasing the current through relay coil M—1 so that it is fully energized. When recording-reproducing control lever 136 is in "neutral" position both relay coil M—1 and resistor R—42 are in series with the plate supply of all the tubes. This introduces a higher than normal resistance in this circuit and thus decreases the plate current to all the tubes. This arrangement tends to decrease the load on the tubes when the apparatus is in "neutral" or non-operating condition and thus tends to prolong tube life and reduce servicing requirements.

Summarizing the operation of this control system above-described, when the recording-reproducing control lever 136 is placed in "recording" position, relay coil M—1 is short circuited and thus deenergized. This connects the A. V. C. control voltage from rectifier V—5 through resistor R—8 and contact K—1 to the grid 32 of tube V—3. It also connects the recorder volume control potentiometer R—37 through contact K—3 to the grid 82 of the power amplifier tube V—8. Finally, it connects the high side of the secondary of the output transformer T—2 through contact K—5 to the recorder element 130. Simultaneously the recorder element 130 is positioned in operative relationship to the record 138. When a signal from the signal source 100 is introduced to the input of the apparatus this signal is amplified by tubes V—1, V—2, and V—8 and applied to the recorder element 130. At the same time a portion of the signal is amplified and rectified by circuit 106 into an A. V. C. control potential which controls the amount of amplification of the signal by tube V—2 in the amplifier A. V. C. stage 104. Through the action of tube V—3 and the cathode-follower phase-inverter stage 108, formed of tubes V—6 and V—7, any "bump" or distortion voltage caused by the operation of the A. V. C. circuit is cancelled out in the output of tube V—6, in the manner above-described, so that the signal amplified by tube V—8 and applied to recorder element 130 corresponds to the original signal undistorted by the operation of the A. V. C. circuit and by any A. V. C. "bump." The average volume of the signal being recorded is determined by the setting of the recording volume control R—37. When the recording-reproducing control lever 136 is placed in "reproducing" position, relay coil M—1 is energized, thereby opening contacts K—1, K—3 and K—5 and closing contacts K—2, K—4, K—6, K—7 and K—8. This grounds the control grid 22 of amplifier tube V—2 through contact K—8 to obviate the possibility of a signal or other interfering voltage being impressed upon the grid of this tube during reproduction. The A. V. C. control voltage from the output of rectifier V—5 is rendered inoperative by being disconnected from the control grid 32 of tube V—3 by opening of the contact K—1 and by being grounded through the closing of contact K—7. At the same time the reproducing element 132 is connected through contact K—2 to the control grid 32 of tube V—3, whence it is amplified and appears across the plate load resistor R—20 of tube V—7 from which it is fed through the reproducing volume control R—36 and contact K—4 to the control grid 82 of power amplifier tube V—8. It is further amplified by tube V—8 and passed through the output transformer T—2 and contact K—6 to the reproducing loudspeaker 118. As above mentioned, the volume during reproduction is determined by the setting of reproducing volume control R—36.

As many embodiments may be made in the above invention and as many changes may be made in the embodiment above described, it is to be understood that all matters hereinbefore set forth or shown in the accompanying drawing is to be interpreted as illustrative only and not in a limiting sense.

We claim:

1. For use in a sound recording electronic tube amplifier system having an input and an output circuit, an amplifier A. V. C. circuit, comprising, in combination, circuit means producing an A. V. C. potential which is a function of the signal being amplified, two amplifier stages each having an input and an output circuit and including a variable-gain tube, means applying said A. V. C. potential as a variable operating bias to both of said amplifier stages, means applying the signal to be amplified to the input circuit of one of said amplifier stages, first and second vacuum tubes having input and output connections and connected in a cathode-follower phase-inverted circuit, means connecting the output circuit of one of said amplifier stages to the input connection of said first tube, means connecting the output circuit of the other of said amplifier stages to the input connection of said second tube, and means connecting the output connection of said first tube to the output circuit of said amplifier system, whereby signal distortion caused by operation of the A. V. C. circuit is substantially eliminated in the output of said amplifier system.

2. For use in a sound recording electronic tube amplifier system having an input and an output circuit, an amplifier A. V. C. circuit, comprising, in combination, circuit means producing a D. C. A. V. C. potential which is a function of the signal being amplified, two amplifier stages each including a remote cut-off pentode tube having an anode, a cathode, and a control grid, means applying said A. V. C. potential as a variable grid bias to both of said pentode tubes, means applying the signal to be amplified to the grid circuit of one of said pentode tubes, two triode vacuum tubes each having an anode, a cathode, and a control grid and connected in a cathode-follower phase-inverter circuit, said last named circuit including first and second cathode resistors connected to the cathodes of said tubes and first and second grid resistors connected respectively between the control grids of said tubes and the junction of said cathode resistors means connecting the plate circuit of one of said pentode tubes to the grid circuit of one of said triode tubes, means connecting the plate circuit of the other of said pentode tubes to the grid circuit of the other of said triode tubes, and means supplying an A. V. C. controlled signal to the output circuit of said amplifier system from the plate circuit of one of said triode tubes, whereby signal distortion caused by operation of the A. V. C. circuit is substantially eliminated in said A. V. C. controlled signal supplied to said amplifier system.

3. For use in a sound recording electronic tube amplifier system having an input and an output circuit, an amplifier A. V. C. circuit, comprising, in combination, circuit means producing an A. V. C. potential which is a function of the signal being amplified, two variable-gain amplifier stages having input and output circuits, means applying said A. V. C. potential as a variable operating bias to both of said amplifier stages, means applying the signal to be amplified to the input circuit of one of said amplifier stages, two vacuum tubes each having input and output connections and connected in a cathode-follower phase-inverter circuit, means connecting the output circuit of one of said amplifier stages to the input connection of one of said last-named tubes, means connecting the output circuit of the other of said amplifier stages to the input connection of the other of said last-named tubes, separate voltage control means for adjusting the ratio of the input voltages applied to said two last-named tubes, and means utilizing the output signal from one of said last-named tubes as the output signal applied to the output circuit of said amplifier system, whereby signal distortion caused by operation of the A. V. C. circuit is substantially eliminated in the output of said amplifier system.

4. In an electronic tube amplifier system having an input and an output circuit for use in sound recording equipment, an A. V. C. amplifier portion comprising, in combination, means for providing a D. C. A. V. C. potential which is a function of the signal being amplified, a first amplifier stage including a first variable-gain vacuum tube, a second amplifier stage including a second variable-gain vacuum tube, said first and second tubes each having an anode, a cathode, and a control grid, the cathode of said second tube being connected to that of said first tube and to a common ground circuit, means for applying the signal being amplified to said first amplifier stage between the control grid of said first tube and said common ground circuit, means for applying said A. V. C. potential to the control grids of both of said tubes to supply a volume-controlled bias thereto, third and fourth vacuum tubes each having a cathode, anode and control grid, means for coupling the plate of said first tube to the control grid of said third tube, resistance-capacitance means for coupling the plate of said second tube to the control grid of said fourth tube, circuit means connecting the cathodes of said third and fourth tubes together and to said ground circuit through a common impedance forming part of the load circuit of said tubes, biasing means for supplying a bias potential between the cathodes and the control grids of said third and fourth tubes, two plate impedances each connected to the anode of one of said third and fourth tubes and each forming the remaining portion of the anode load of its respective tube, conductive means connecting said two last-named plate load impedances together and through a source of positive anode potential to said ground circuit, means for supplying the signal to the output circuit of said amplifier system from said A. V. C. amplifier portion from between the anode of either of said third or fourth tubes and the ground circuit, whereby any distortion of the amplified signal due to operation of the A. V. C. circuit is substantially eliminated in the output circuit of said amplifier portion.

5. In an electronic tube amplifier system having an input and an output circuit for use in sound recording equipment, an A. V. C. amplifier portion comprising, in combination, means for providing a D. C. A. V. C. potential which is a function of the signal being amplified, a first amplifier stage including a first variable-mu vacuum tube, a second amplifier stage including a second variable-mu vacuum tube, said first and second tubes each having an anode, a cathode, and a control grid, the cathode of said second tube being connected to that of said first tube and to a common ground circuit, means for applying the signal being amplified to said first amplifier stage between the control grid of said first tube and said common ground circuit, circuit means for applying said A. V. C. potential to the control grids of both of said tubes to supply a variable operating bias potential thereto, third and fourth vacuum tubes each having a cathode, anode, and control grid, resistance-capacitance means for coupling the plate of said first tube to the control grid of said third tube, resistance-capacitance means for coupling the plate of said second tube to the control grid of said fourth tube, voltage control means associated with coupling means for adjusting the ratio of the input voltages applied to the grids of said third and fourth tubes, means connecting the cathodes of said third and fourth tubes together and to said ground circuit through a common impedance forming part of the anode load of said tubes, biasing means for supplying a bias potential between the cathodes and the control grids of said third and fourth tubes, two plate load impedances each connected to the anode of one of said third and fourth tubes and each forming the remaining portion of the anode load of its respective tube, means connecting said two last-named plate load impedances together and through a source of positive anode potential to said ground circuit, means for supplying the signal to the output circuit of said amplifier system from said A. V. C. amplifier portion from between the anode of either said third or fourth tubes and the ground circuit, whereby any distortion of the amplified signal due to operation of the A. V. C. circuit is substantially eliminated in the output circuit of said amplifier portion.

6. In an electronic tube amplifier for use in sound recording equipment, an A. V. C. amplifier portion comprising, in combination, means for providing a D. C. A. V. C. potential proportional to the signal being amplified, a first amplifier stage including a first variable-mu vacuum tube, a second amplifier stage including a second variable-mu vacuum tube, said first and second tubes each having an anode, a cathode, and a control grid, the cathode of said second tube being connected to that of said first tube and to a common ground circuit in said amplifier portion, circuit means for applying the signal being amplified to said first amplifier stage between the control grid of said first tube and said common ground circuit, coupling means for applying said A. V. C. potential to the control grids of both of said tubes through individual grid resistors to supply a volume-controlled bias thereto, third and fourth vacuum tubes each having a cathode, anode, and control grid, capacitive means for coupling the plate of said first tube to the control grid of said third tube, capacitive means for coupling the plate of said second tube to the control grid of said fourth tube, means connecting the cathodes of said third and fourth tubes together and to said ground circuit through a first common resistor acting as a self-biasing means for said tubes and a second common resistor forming part of the anode load of said tubes, connection means for applying the bias potential from said first common resistor to the control grids of said third and fourth tubes through individual grid resistors, two plate resistors each connected to the anode of one of said third and fourth tubes and each forming the remaining portion of the anode load of its respective tube, means connecting said two last-named plate load resistors together and through a source of positive anode potential to said ground circuit, means for supplying the signal to the output circuit of said amplifier system from said A. V. C. amplifier portion across one of said last-named plate load resistors, whereby any distortion of the amplified signal due to operation of the A. V. C. circuit is substantially cancelled out in said plate load resistor.

FREDERICK W. ROBERTS.
ROGER C. CURTIS.

REFERENCES CITED

The following references are of record in the file of this patent:

UNITED STATES PATENTS

| Number | Name | Date |
|---|---|---|
| 2,092,496 | Branson | Sept. 7, 1937 |
| 2,179,414 | Konkle | Nov. 7, 1939 |